United States Patent [19]
Voller

[11] Patent Number: 5,806,572
[45] Date of Patent: Sep. 15, 1998

[54] APPARATUS FOR INFLATING AND DEFLATING A DUNNAGE BAG

[76] Inventor: Ronald L. Voller, 5 N. 751 Maple Ct., Medinah, Ill. 60157

[21] Appl. No.: 611,564

[22] Filed: Mar. 6, 1996

[51] Int. Cl.⁶ .................... B65B 1/04; B65B 3/04
[52] U.S. Cl. .................. 141/10; 141/4; 141/94; 141/114; 141/312; 141/317; 410/119
[58] Field of Search .................. 141/4, 10, 38, 141/65–68, 83, 94–96, 114, 192, 197, 285, 289, 290, 301, 302, 307, 312–314, 317; 410/119, 125; 428/34.1, 34.3

[56] References Cited

U.S. PATENT DOCUMENTS

| | | | |
|---|---|---|---|
| 2,674,206 | 4/1954 | Scott | 105/369 |
| 3,076,564 | 2/1963 | McManus | 214/10.5 |
| 3,145,853 | 8/1964 | Langenberg | 214/10.5 |
| 3,240,240 | 3/1966 | Crabb | 141/38 |
| 3,260,295 | 7/1966 | Rhodes | 152/415 |
| 3,426,891 | 2/1969 | Marks | 206/46 |
| 3,442,402 | 5/1969 | Baxter | 214/10.5 |
| 3,667,625 | 6/1972 | Lucas | 214/10.5 D |
| 3,808,981 | 5/1974 | Shaw | 105/369 BA |
| 3,827,635 | 8/1974 | Krakowski et al. | 141/38 |
| 3,868,026 | 2/1975 | Baxter | 214/10.5 D |
| 4,076,872 | 2/1978 | Lewicki et al. | 428/12 |
| 4,102,364 | 7/1978 | Leslie et al. | 141/4 |
| 4,146,069 | 3/1979 | Angarola et al. | 141/68 |
| 4,146,070 | 3/1979 | Angarola et al. | 141/68 |
| 5,042,541 | 8/1991 | Krier et al. | 141/313 |
| 5,111,838 | 5/1992 | Langston | 137/223 |
| 5,288,188 | 2/1994 | Vance | 410/119 |
| 5,437,301 | 8/1995 | Ramsey | 410/119 |
| 5,566,728 | 10/1996 | Lange | 141/10 |

OTHER PUBLICATIONS

"The Most Complete Line of Automotive Parts & Accessories", J.C. Whitney & Co., No. 508J, p. 182, Jan. 1989.

*Primary Examiner*—Henry J. Recla
*Assistant Examiner*—Timothy L. Maust
*Attorney, Agent, or Firm*—Robert A. Brown

[57] ABSTRACT

A reusable dunnage bag is provided for placement between or among boxes or packages of diverse products packed or stored for shipment in trailers or containers so as to cushion and protect the products from damage in being transported from one location to another. The bag includes a self closing valve operable to open so as to permit entry of pressurized medium into the bag, but automatically closes when fully inflated. A gun-like device having dual nozzles is provided for opening the self closing valve for rapid admission of gaseous medium into the bag and for opening the valve to quickly expel the medium therefrom. A discernible difference in noise frequency signals an operator to remove the connection between the gun and the self closing valve when inflation of the bag is complete.

16 Claims, 3 Drawing Sheets

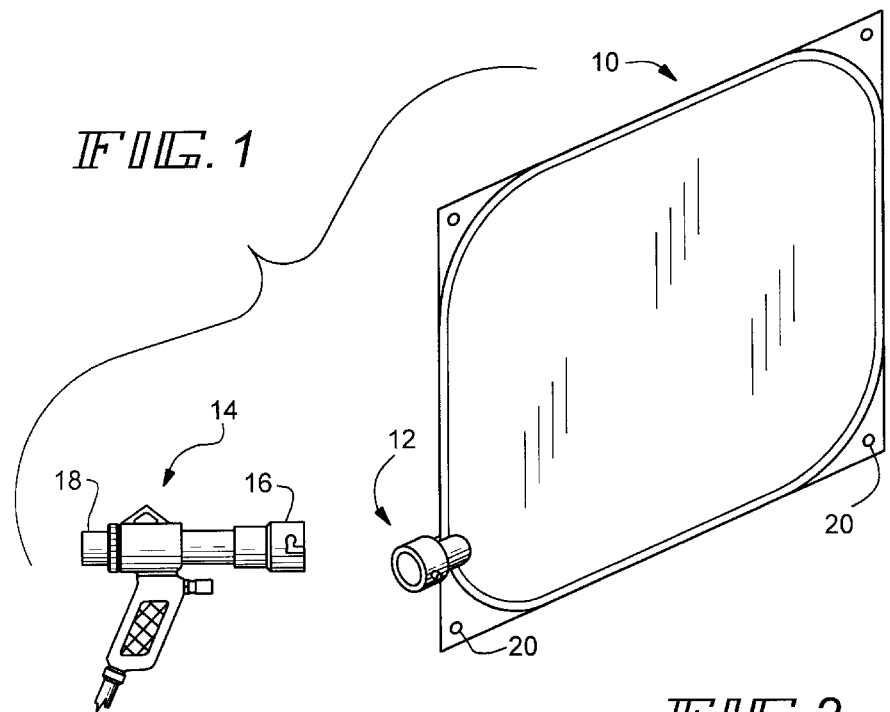
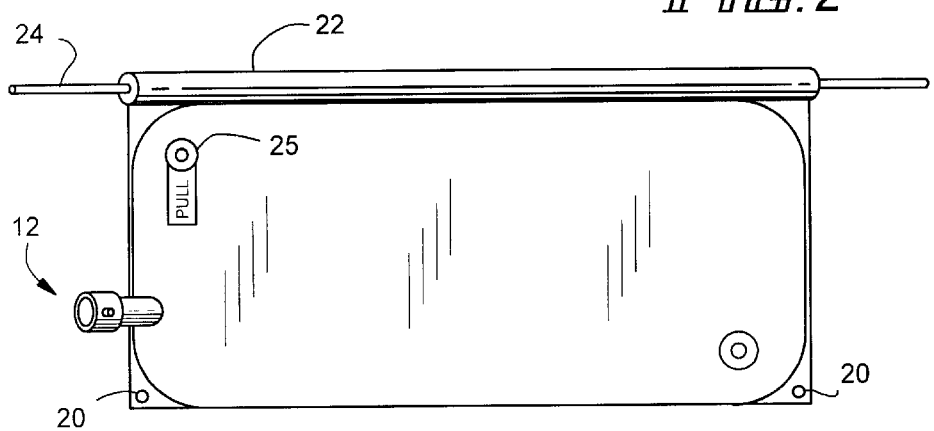
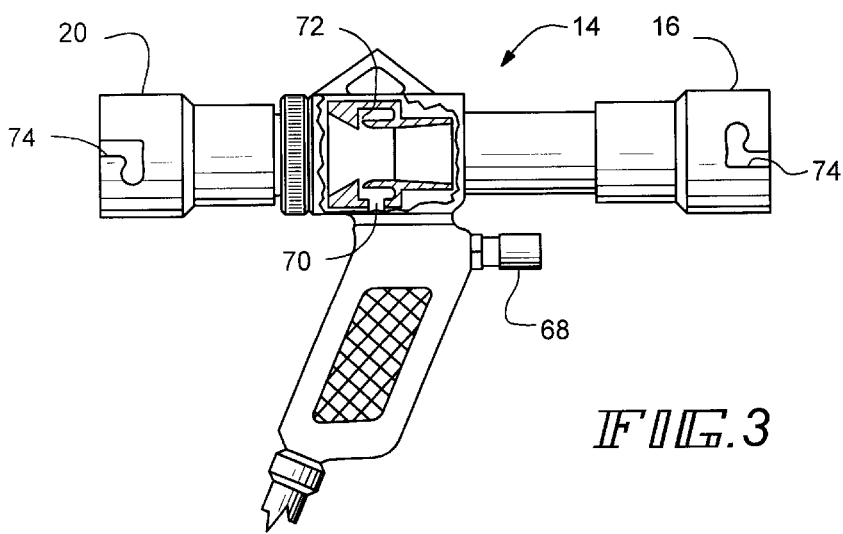

APPARATUS FOR INFLATING AND DEFLATING A DUNNAGE BAG

BACKGROUND OF THE INVENTION

The present invention relates generally to dunnage bags and means for inflation thereof and more particularly to a reusable dunnage bag and to an associated gun-type device that rapidly pressurizes the bag to an operative condition and quickly deflates the bag when taken out of use. The gun serves to rapidly inflate, limit and control internal bag pressure and quickly to deflate the bag.

Dunnage bags are used to cushion shipments of goods transported by rail, ship, truck, aircraft, or wherever it is necessary to position resilient members in order to fill voids or spaces between products in transit and thereby prevent their shifting about and being damaged before reaching a point of destination. Dunnage bags may be disposable or reusable.

Disposable dunnage bags are made from inexpensive materials, such as paper, but even so, they are fragile, easily punctured and the cumulative costs associated therewith make their use uneconomical. Disposable dunnage bags more than likely are made from an inner gas-tight bladder constructed from material such as polyethylene and an outer shroud or containment member such as heavy paper. A disposable bag is effective to fill spaces between cargo, between cargo and the walls of a trailer, container or other freight transporting carrier and thereby prevent damage to the cargo that might result from shifting about within the confines of the carrier. A deflated bag is placed between articles of cargo and is subsequently pressurized with gas, usually ambient air, to a preselected pressure, such as 1 to 7 pounds per square inch.

Users of disposable bags have been confronted with a number of problems during the process of inflation. This type of bag is normally inflated with a high pressure air gun that injects air through a valve in the side or end of the bag. This type of valve is likely to be constructed from various dissimilar materials, such as a plastic or metal stem, a metal biasing spring and polyethylene for heat sealing the valve to an inner bladder of the bag so as to make an airtight connection. In addition, when bags are inflated to typical high pressures of up to 120 pounds per square inch, unless proper pressure regulating devices are incorporated into the dunnage bag structure, an over pressurized bag may erupt and damage the cargo and/or the carrier. Also, if a bag were to be equipped with a pressure relieving device, the bag would become deflated and no longer could provide any cushioning function for cargo in a container.

Prior art disclosures which are relevant to the present invention are found in U.S. Pat. Nos. 4,146,069 and 4,146,070 to Angarola; 3,426,891 to Marks; 4,076,872 to Lewicki; 3,442,402 to Baxter. The Angarola references disclose devices for rapidly inflating and pressurizing dunnage bags. Marks shows a cargo cushion construction consisting of an inflatable bladder surrounded by a fabric knitted cover. Lewicki discloses pneumatic cushions or the like wherein an uppermost sheet may be formed of polyurethane. The Baxter reference shows a dunnage unit constructed so as to receive rod members.

Reusable dunnage bags are mainly made of single or multiple plies of rubber, plastic or fabric constructed from different materials, such as Nylon laminated to polyurethane to form sheets of material for bonding together to make a dunnage bag. The bag may be manufactured in any shape or size, but typically is made in a rectangular configuration, 48" by 48" with internal space or volume that inflates to a dunnage bag approximately 8" thick. Reusable bags provide a strong resilient member for cushioning cargo, but are heavy, unwieldy and take an inordinate length of time to inflate. In addition, deflation of a bag is inefficient, requires a long time interval and seldom, if ever, deflates sufficiently in order to accommodate easy removal from a cushioning station between stacked packages, receptacles or boxes of cargo.

SUMMARY OF THE INVENTION

Therefore, is a primary object of the present invention to provide a dunnage bag that includes inner and outer plies of plastic material bonded together to inflate to a preselected volume of space therebetween and a self closing valve affixed to the bag for admitting or expelling ambient gas.

It is a further object of the present invention to provide a cargo cushioning apparatus including a rapidly inflatable and quickly deflatable dunnage bag, a self closing valve bonded thereto and gun member means operable for at times pressurizing the bag to a preselected pressure and thereafter evacuating said pressure to ambient conditions.

An additional object of the present invention is to provide a dunnage bag rapidly inflatable to a preselected low pressure and quickly deflatable to ambient conditions within a predetermined short period of time.

Another object of the present invention is to provide a cargo cushioning apparatus including a quickly inflatable and deflatable dunnage bag, a self closing valve bonded thereto and gun member means having dual nozzle means for opening and closing the valve.

An additional object of the present invention is to provide an apparatus for cushioning packed packages of products during shipment including a rapidly inflatable and quickly deflatable dunnage bag, a self closing valve bonded thereto and gun member means having first nozzle means effective to provide a flow of air at a noise frequency of a first measurable value to open said self closing valve and effective to close said self closing valve when noise frequency achieves a second significantly higher pitched value.

A still further object of the present invention is to provide a method for cushioning products stored for shipment in trucks and/or containers by placing deflated dunnage bags between and among the stored products, rapidly inflating the bags so as to fill voids and spaces between and among the products during shipment, quickly deflating the bags when the products reach their destination, and reusing the bags for subsequent cushioning of products shipped from one destination to another.

The above and further objects are achieved in accordance with the present invention wherein there is provided a reusable dunnage bag comprising inflatable laminated bladder means, self closing valve means secured to said bladder means, said valve means having outer housing means, longitudinally movable, check valve means resiliently secured within said housing means for at times closing an aperture therein, said housing means at times fixedly connecting with first end nozzle means of gun member means for receiving forced ambient air at a discernible noise frequency therefrom, and said housing means operable at other times for fixedly connecting with second end nozzle means of said gun member means for evacuating pressurized medium from said dunnage bag. The present invention also provides an apparatus for cushioning stacked packages of products during shipment from one location to another comprising dunnage bag means for inflation and deflation between said stacked packages of products, self closing valve means secured to said dunnage bag means operable to admit and expel gaseous medium to and from said dunnage bag means, gun member means having nozzle means for at times being releasably connected to said self closing valve means, compressor source means for providing a concentrated high volume, high velocity flow of said gaseous medium at a discernible noise frequency through said nozzle means and said self closing valve means into said dunnage bag means for inflation thereof, said nozzle means operable to induce an interruption of flow of said gaseous medium when inflation of the bag achieves a preselected pressurization therein, said interruption of flow of gaseous medium into said bag is operable to arrest the flow of the gaseous medium through said nozzle means and create a noticeably higher frequency of noise than the discernible noise during inflation of the bag, and said noticeable higher frequency of noise is operable to signal an operator to release said nozzle means from said self closing valve.

BRIEF DESCRIPTION OF THE DRAWING

The foregoing and other characteristics, objects, features and advantages of the present invention will become more apparent upon consideration of the following detailed description, having reference to the accompanying features of the drawing, wherein:

FIG. 1 is a perspective view of an inflatable dunnage bag showing adjacent thereto a pistol-like device or gun member for at times being connected to the dunnage bag in accordance with the present invention.

FIG. 2 is an elevational side view of the inflatable dunnage bag shown in FIG. 1, showing means for portage or transportation of a bag and means for rapid evacuation of medium from an inflated bag.

FIG. 3 is an enlarged elevational side view of the gun member shown in FIG. 1 wherein an intermediate portion thereof has been sectioned in order to illustrate the manner air or other medium is selectively directed toward first and second outlet ends of the gun member.

DESCRIPTION OF A PREFERRED EMBODIMENT

Figure 4:
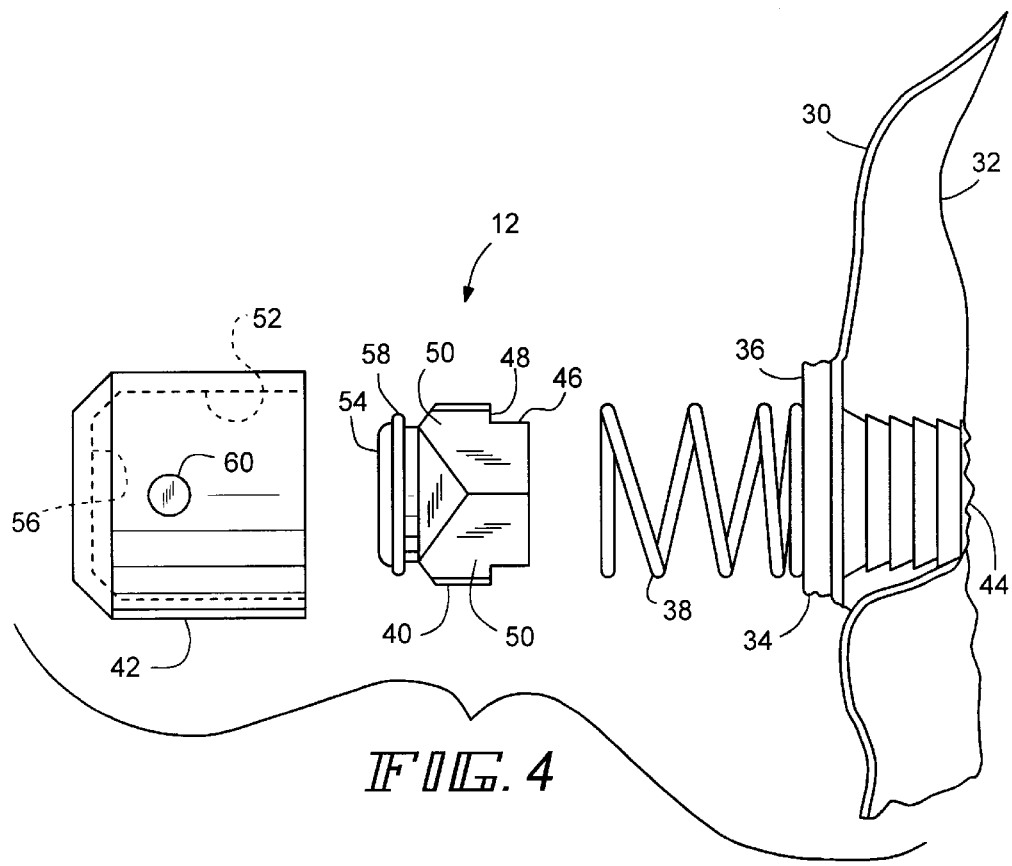
FIG. 4 depicts component parts of a disassembled self closing valve assembly shown in FIG. 1 adaptable to have one end integrally fixed, molded or otherwise secured to a dunnage bag and an outer end housing operable when connected to a first end of the gun member to permit flow of air into the bag.

Referring now to FIG. 1, there is shown an non-elastic dunnage bag having available an enclosed, sealed volume or space and operable to inflate and deflate, generally identified by reference numeral 10. The bag may be formed from an inner ply of plastic material, such as polyurethane or other suitable combination, and an outer ply of plastic material, such as nylon or other suitable formulation. The inner ply and outer ply are laminated together or otherwise joined to each other and thereby form a preferred construction of dunnage bag in accordance with the present invention. The bag 10 includes a self closing, check valve assembly, generally identified by reference numeral 12, integrally molded or otherwise secured to an end portion or any other preselected location on the bag for permitting ingress and egress of pressurized medium to or from the available inner space or volume disposed within the bag.

As further shown in FIG. 1, a portable, pistol-like device or gun member, generally identified by reference numeral 14, has a plurality of nozzle means adaptable at times to be connected with the valve assembly 12 for inflating and deflating the bag 10. The gun member 14 has first end nozzle means 16 operable when connected to the valve assembly 12 to force open its internal self closing mechanism and permit the flow of ambient air into the bag for pressurization thereof to a preselected range between 3 and 10 pounds per square inch or other desired pressurized force of inflation. The gun also has second end nozzle means 18 operable when connected to the valve assembly to force open its internal self closing mechanism and thereby evacuate pressurized medium from the bag for deflation thereof within a very short period of time, such as the complete evacuation of approximately 400 cubic feet to ambient conditions within a time period of between 15 and 30 seconds. The bag 10 may have disposed at each of its four corners an aperture 20, including optional reinforcement thereof by a ferrule or bushing, that may be fitted over a hook or other suitable holding means to facilitate stowage of the deflated bag when not in use.

Figure 7:
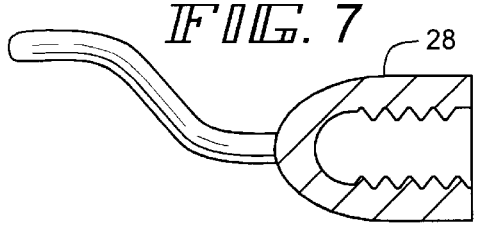
FIG. 7 represents a broken away telescopic handling rod having an end portion adaptable to be connected to a corner end of a dunnage bag to facilitate positioning the same between stacks of packaged goods for shipment.
Figure 8:
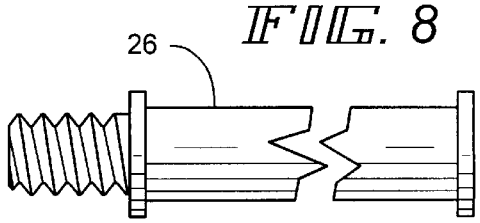
FIG. 8 is an offset adapter member for connecting to the end of the telescopic rod shown in FIG. 7 and operable to facilitate positioning a dunnage bag in narrow, confined spaces or overhead of stacked goods for shipment in trailers or containers.
Figure 9:
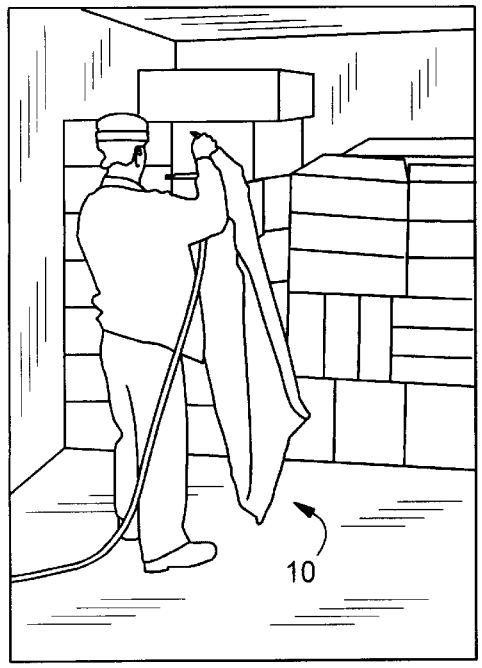
FIG. 9 is a perspective view of a deflated dunnage bag in position for placement between stacked boxes or containers of products shipped in a trailer.
Figure 10:
FIG. 10 is a next step perspective view of the positioned dunnage bag wherein an operator is in process of attaching gun apparatus for inflating the dunnage bag.
Figure 11:
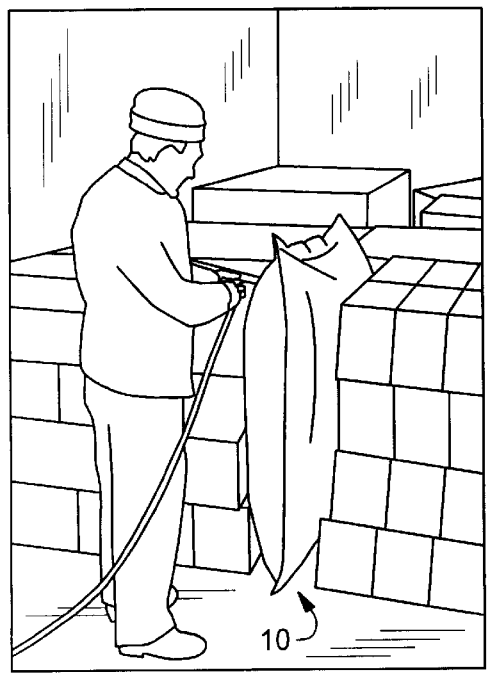
FIG. 11 is a next progressive step perspective view of the operator wherein inflation of the dunnage bag has been substantially completed so as to act as a protective cushioning member during shipment of the stored boxes of products.
Figure 12:
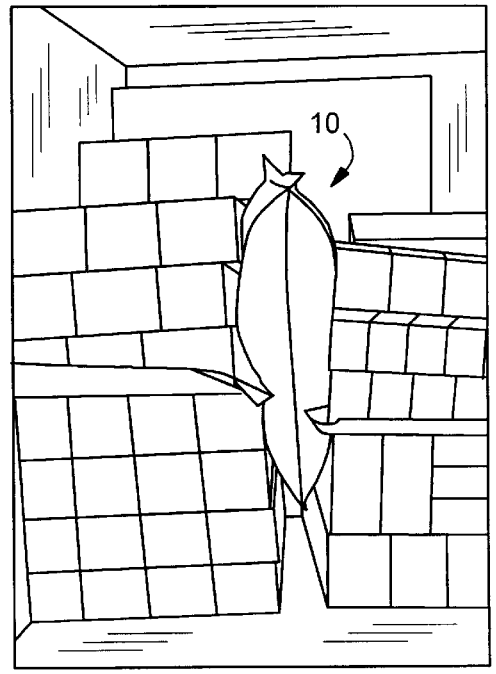
FIG. 12 is an elevational end view of a inflated dunnage bag disposed between stacked boxes or containers of products shipped in a trailer wherein the bag is in an operative cushioning position in accordance with the present invention.

In FIG. 2 there is shown an optional form of construction wherein a top portion of the bag is rolled over to form a tube-like structure 22 which may receive therethrough a pole 24 or similar implement and thereby provide an optional procedure for carrying the bag from place to place or for placing distal ends of the pole over holding means as an alternate storage or stowage arrangement. Also disclosed is a quick release valve 25 that is effective when pulled open, or opened by otherwise suitable means exposes inner pressure to atmosphere, to quickly deflate the bag from full to a lower pressurization, if such procedure is desirable. The bag may be thereafter fully deflated by connecting the second nozzle means 18 to the valve 12 and operating the gun member 14. There also may be provided a telescoping rod 26 (See FIG. 7) adaptable for engagement with a selected one of the apertures 20 of the bag in order to facilitate placement of the bag between stacked boxes of goods. There may be further provided an offset adapter member 28 (See FIG. 8) for attachment to the outer end of the rod 26. The adapter member 28 may have one end threadably connected to the outer end of the telescoping rod 26 and its other end is operable for engagement with an aperture 20 so that the bag may be easily moved about and conveniently positioned or placed in a narrow space between adjacent stacks of goods for shipment.

FIG. 4 shows a fragmentary portion of a first ply 30 and a second ply 32 of a reusable bag wherein a base member 34 of the self closing valve 12 is bonded to or otherwise fixedly secured thereto. The base member 34 extends outwardly from the bag and has formed at its outer end a circumferential, annular, face surface 36 providing a reactive base for a resilient spring 38. The self closing valve 12, shown here in disassembly for ease of understanding, includes the base member 34, the spring 38, a movable stop member 40 and a valve housing 42. The base member 34 has formed therethrough a bore 44 of suitable diameter to permit a predetermined velocity of air or other gaseous medium to flow therethrough into or out of the bag for rapid inflation or quick deflation thereof. The spring 38 has one end in contact with the annular face end surface 36 of the base member 34 and its other end is adaptable to fit over and about an outer peripheral surface 46 on the stop member 40 and seat against a stop surface 48 formed thereon. The stop member 40 includes guide vanes 50 to facilitate longitudinal movement within a bore 52 of predetermined diameter formed within the valve housing 42. The stop member 40 is operable to move longitudinally along a central axis of the valve 12. When the valve is assembled, the stop member 40, as urged by the spring 38, has a frontal ring surface 54 in sealing contact with an entry aperture 56 formed at an outer end of the valve housing 42. The stop member 40 is fitted with an O-ring 58 to provide a positive seal within the valve housing and prevent any undesirable leakage of air from an inflated dunnage bag. The valve housing has formed thereon stud members 60 (only one is shown) for interlocking with complementary shaped slot means formed in the first nozzle means 16.

Figure 5:
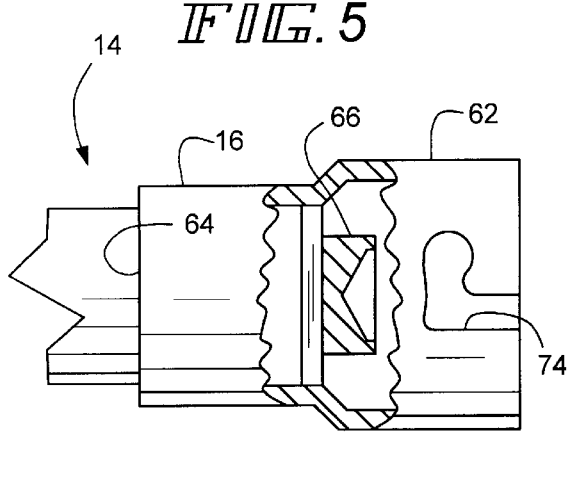
FIG. 5 illustrates nozzle means adaptable to be releasably positioned on either first or second outlet ends of the gun member and having a portion thereof sectioned along lines A—A of FIG. 6 to show a side view of internal baffle means for deflecting flow of medium therethrough.
Figure 6:
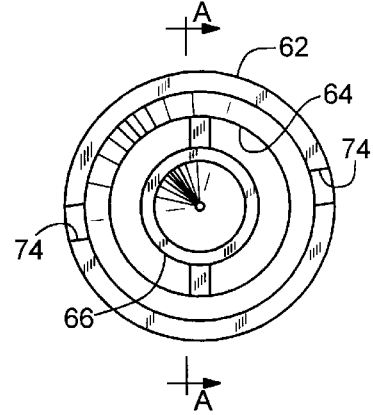
FIG. 6 is a right side view of the nozzle means depicted in FIG. 5 showing further details of the internal baffle means seen therein.

The first nozzle means 16 is best seen in FIG. 5 and includes an outer circular connecting member 62 having an opening 64 at one end of a size operable to slide over and be positioned on the end of a barrel of the gun 14. The connecting member 62 is operable to slide over and about an outer circumferential surface of the valve housing 42 into engagement therewith so that the slots 74 slide over the studs or lugs 60. The member 62 may then be twisted a preselected portion of a revolution to effect a tight connection with the valve 12. The member 62 has formed therein baffle means 66 that has a diameter substantially equal to a diameter of front ring surface 54 of the valve assembly 12. When nozzle means 16 is twisted on and secured to housing 42, the baffle means is urged against front ring surface 54 which depresses spring 38, and connects the gun directly with the inner space of the bag 10. The force of baffle means against front ring surface 54 is sufficient to overcome the resistance of spring 38, which moves the stop member 40 longitudinally, opening the valve assembly 12 and air flows therein until inflation thereof is complete.

FIGS. 9–12 illustrate the manner in which a deflated bag may be positioned between adjacent stacked packages or boxes containing products for shipment in trucks, containers or other confined storage space. The deflated bag is placed by a worker in any available space between adjacent stacks of packages so that the valve assembly 12 of the bag 10 is accessible. The worker then places first nozzle means 16 of the gun member 14 in a twist-locked secure connection with the valve assembly 12 for opening thereof as hereinbefore described. Gun member 14 is connected in a known manner to a supply of pressurized gaseous medium, such as an air compressor (not shown). The worker by operation of a trigger mechanism 68 or other suitable means connects the pressurized medium for flow through the open valve assembly 12.

Operation of the trigger mechanism 68 permits compressed air to flow through a inlet into an annular chamber 70 (See FIG. 3) of the gun 14 and is then throttled through a small ring nozzle 72 at a high velocity of movement. This primary air stream assumes a predetermined profile and is directed toward the first nozzle means 16. A low pressure area is created at the center of the chamber 70 inducing a high volume flow of surrounding air into the primary air stream. The combined flow of primary and surrounding air exhausts from the barrel of the gun and is directed through the first nozzle means 16 into the bag at a high volume, high velocity flow. Accordingly, this high volume, high velocity rate of gaseous medium flows freely past the depressed and open stop member 40 of the self closing valve 12 and quickly inflates to bag to a preselected working pressure.

The operation of the gun is based upon an air flow principle of 10 to 1 amplification; that is, for example, the gun consumes 23 cubic feet per minute at 100 pounds per square inch and delivers an output of 230 cfm at 2 psi. In the operation of the invention, the operator attaches the first nozzle means 16 to the self closing valve 12 attached to the bag, which caused it to open, and then triggers the gun to deliver air into the bag. It is well known that flow of air at high velocity through a duct or cylinder of a certain diameter creates an identifiable and measurable frequency of noise that is easily discernible by the human ear. That is, a human ear can easily distinguish between the frequency of air traveling at a specific, respective velocity through a duct that delivers either 23 cfm or 230 cfm. The frequency, or noise level, at 230 cfm is considerably higher than at 23 cfm. Accordingly, when the operator connects the gun to the bag and operates the trigger mechanism, air flows into the bag until there is achieved an equilibrium between the internal pressure of the bag and the pressure exerted by the air flowing from the gun nozzle 16 into the bag. At this moment the air flow principle on which the gun operates ceases to function and air from the compressor flows away from the nozzle 16 and valve 12 connection back through the negative pressure side of the gun, exiting through nozzle 18. This so-called backward flow of air reaches a high velocity of travel and results in a noise level or frequency that is clearly recognizable by the operator. The operator then knows it is an appropriate moment to disconnect the high pressure, first nozzle 16 end of the gun from the self closing valve 12. The valve closes and the bag is inflated to and remains at its working condition.

As noted above, during inflation of the bag, there is a noticeable degree of noise or pitch frequency. When the bag achieves full inflation, the flow of air through the first nozzle 16 is interrupted and arrested. Air is then by-passed through the chamber 70 of the gun 14 to exit out of second nozzle means 18 and the noise associated therewith is of a high pitch or frequency. This change in noise frequency signals the operator that it is an appropriate time to disconnect the high pressure, first nozzle 16 from the bag valve.

At this moment, the force of the pressurized medium within the bag keeps the valve assembly closed and is effective to maintain the bag at a desired force of pressurization. The properly inflated bag fills the space between and cushions the stacked boxes. After the cushioned packages of products are transported to a desired end point location for unloading, a worker places second end nozzle means 18 of a gun member 14 in a secure connection with the valve assembly 12. Connection of the second nozzle means opens the valve 12 in the same manner of hereinbefore described with reference to the first nozzle means 16. Activation of the trigger mechanism 68 connects the open valve assembly 12 and thereby permit the pressurized medium to flow out of and quickly deflate the bag. The outward flow of air from the bag is induced and amplified in the same, but reverse manner as described in filling the bag. That is, the velocity of air exhausting from the bag is amplified by a factor of ten and the bag is fully emptied in several seconds, rather than be partially evacuated as is prevalent in the state of the art. Alternatively, as discussed hereinabove, the quick release valve 25 may be operated to substantially evacuate the bag and the gun member 14 may be thereafter connected to the valve 12 to induce complete deflation of the bag 10.

As seen in FIG. 3, the first nozzle means 16 of gun 14 may be configured with the construction of connecting member 62 for locking with the valve 12 and admitting pressurized medium into bag 10 for inflation thereof. Similarly, a connecting member 62 may be fitted to second end nozzle means 18 of the gun 14 for causing pressurized medium to exit from the bag 14 for deflation thereof.

While the present invention has been described with reference to the above preferred embodiments, it will be understood by those skilled in the art, that various changes may be made and equivalence may be substituted for elements thereof without departing from the scope of the present invention. In addition, modifications may be made to adapt a particular situation or material to the teachings of the present invention without departing from the scope of the present invention. Therefore, it is intended that the invention not be limited to the particular embodiments disclosed for carrying out this invention, but that the present invention includes all embodiments falling within the scope of the appended claims.

I claim:

1. A reusable dunnage bag for inflation and deflation so as to cushion packaged products during shipment from one location to another comprising inflatable and deflatable laminated bladder means operable for multiple reuse in cushioning said packaged products, gun member means for inflating and deflating said bladder means, check valve means secured to said bladder means, said check valve means comprising outer housing means, base member means disposed within said housing means and having a bore formed therethrough for directly admitting and directly expelling pressurized gaseous medium into and out of said bladder means, check valve means longitudinally movable and resiliently secured against an annulus of said base member means for at times closing an entry aperture formed in said housing means, said housing means at times fixedly connecting with first end nozzle means of said gun member means for opening said check valve means and receiving directly through said bore forced high volume, high velocity ambient air at a discernible noise frequency therefrom, said housing means operable at other times for fixedly connecting with second end nozzle means of said gun member means for opening said check valve means and evacuating pressurized medium directly through said bore from said dunnage bag, and said dunnage bag has apertures disposed at each of its four corners for cooperating with holding means to facilitate storage of a deflated dunnage bag when not in use, whereby said bag when inflated is operable to cushion products during shipment; and when deflated may be reused and later re-inflated to cushion goods during shipment.

2. A reusable dunnage bag as claimed in claim 1 including compressor source means for providing a preselected pressurization in said dunnage bag, said preselected pressurization within said bag is operable to arrest the flow of said ambient air through said first nozzle means, and create a noticeably higher frequency of noise than the discernible noise during inflation of the bag, and said noticeable higher frequency of noise is operable to signal an operator to release said first nozzle means from said check valve means.

3. A reusable dunnage bag as claimed in claim 2 wherein said dunnage bag is inflated to a pressure of between 3 and 10 pounds per square inch.

4. A reusable dunnage bag as claimed in claim 2 wherein said gun member means comprises first nozzle means for inflation of said dunnage bag to a volume of approximately 400 cubic feet at a pressure of substantially 3 pounds per square inch.

5. A reusable dunnage bag as claimed in claim 2 wherein said dunnage bag is inflated to a preselected volume of capacity within a time period of substantially 15 seconds.

6. A reusable dunnage bag as claimed in claim 2 wherein said gun member means comprises second nozzle means for deflation of said dunnage bag means within a time period of between 15 and 30 seconds.

7. A reusable dunnage bag as claimed in claim 2 wherein said gun member means comprises said second nozzle means for attachment to said check valve means for opening thereof so as to quickly deflate said dunnage bag.

8. A reusable dunnage bag as claimed in claim 2 wherein said gun member means amplifies delivery of said ambient air into said bag at a ratio of substantially ten to one.

9. A reusable dunnage bag as claimed in claim 8 wherein delivery of said ambient air into said bag is amplified to substantially 230 cubic feet at 10 pounds per square inch from an initial condition of substantially 23 cubic feet at 100 pounds per square inch.

10. A reusable dunnage bag as claimed in claim 1 wherein said bladder means comprises a plurality of bonded sheet materials formed from a first ply of nylon and a second ply of polyurethane laminated thereto.

11. A reusable dunnage bag as claimed in claim 1 wherein said bladder means comprises a plurality of bonded sheet materials formed from a first ply of flexible material and a second ply of flexible material dissimilar therefrom.

12. A reusable dunnage bag for inflation and deflation so as to cushion packaged products during shipment from one location to another comprising inflatable and deflatable laminated bladder means operable for multiple reuse in cushioning said packaged products,

9 gun member means for inflating and deflating said bladder means, check valve means secured to said bladder means, said check valve means comprising outer housing means, base member means disposed within said housing means and having a bore formed therethrough for directly admitting and directly expelling pressurized gaseous medium into and out of said bladder means, check valve means longitudinally movable and resiliently secured against an annulus of said base member means for at times closing an entry aperture formed in said housing means, said housing means at times fixedly connecting with first end nozzle means of said gun member means for opening said check valve means and receiving directly through said bore forced high volume, high velocity ambient air at a discernible noise frequency therefrom, said housing means operable at other times for fixedly connecting with second end nozzle means of said gun member means for opening said check valve means and evacuating pressurized medium directly through said bore from said dunnage bag, and said dunnage bag includes a top portion thereof to form tube-like structure means for at times receiving a portage implement for carrying the bag from place to place and storage thereat, whereby said bag when inflated is operable to cushion products during shipment; and when deflated may be reused and later re-inflated to cushion goods during shipment.

13. A reusable dunnage bag for inflation and deflation so as to cushion packaged products during shipment from one location to another comprising inflatable and deflatable laminated bladder means operable for multiple reuse in cushioning said packaged products, gun member means for inflating and deflating said bladder means, check valve means secured to said bladder means, said check valve means comprising outer housing means, base member means disposed within said housing means and having a bore formed therethrough for directly admitting and directly expelling pressurized gaseous medium into and out of said bladder means, check valve means longitudinally movable and resiliently secured against an annulus of said base member means for at times closing an entry aperture formed in said housing means, said housing means at times fixedly connecting with first end nozzle means of said gun member means for opening said check valve means and receiving directly through said bore forced high volume, high velocity ambient air at a discernible noise frequency therefrom, said housing means operable at other times for fixedly connecting with second end nozzle means of said gun member means for opening said check valve means and evacuating pressurized medium directly through said bore from said dunnage bag, and including telescoping rod means for cooperating with a selected one of apertures disposed on said bag to facilitate placement of a deflated bag between stacked packages of goods,

10 whereby said bag when inflated is operable to cushion products during shipment; and when deflated may be reused and later re-inflated to cushion goods during shipment.

14. A reusable dunnage bag as claimed in claim 13 including offset adapter means for attachment to an outer end of said telescoping rod means for ease of movement and placement of the bag in narrow spaces between adjacent stacks of packaged goods.

15. A reusable dunnage bag for inflation and deflation so as to cushion packaged products during shipment from one location to another comprising inflatable and deflatable laminated bladder means operable for multiple reuse in cushioning said packaged products, gun member means for inflating and deflating said bladder means, check valve means secured to said bladder means, said check valve means comprising outer housing means, base member means disposed within said housing means and having a bore formed therethrough for directly admitting and directly expelling pressurized gaseous medium into and out of said bladder means, check valve means longitudinally movable and resiliently secured against an annulus of said base member means for at times closing an entry aperture formed in said housing means, said housing means at times fixedly connecting with first end nozzle means of said gun member means for opening said check valve means and receiving directly through said bore forced high volume, high velocity ambient air at a discernible noise frequency therefrom, said housing means operable at other times for fixedly connecting with second end nozzle means of said gun member means for opening said check valve means and evacuating pressurized medium directly through said bore from said dunnage bag, and quick release valve means for immediate evacuation of pressurized gaseous medium from the bag for substantial deflation thereof, whereby said bag when inflated is operable to cushion products during shipment; and when deflated may be reused and later re-inflated to cushion goods during shipment.

16. A reusable dunnage bag for inflation and deflation so as to cushion packaged products during shipment from one location to another comprising inflatable and deflatable laminated bladder means operable for multiple reuse in cushioning said packaged products, said bladder means is inflated to a volume of substantially 400 cubic feet at a pressure of substantially 3 pounds per square inch within a time period of substantially 15 seconds, gun member means for inflating and deflating said bladder means, check valve means secured to said bladder means, said check valve means comprising outer housing means, base member means disposed within said housing means and having a bore formed therethrough for directly admitting and directly expelling pressurized gaseous medium into and out of said bladder means, check valve means longitudinally movable and resiliently secured against an annulus of said base member means for at times closing an entry aperture formed in said housing means, said housing means at times fixedly connecting with first end nozzle means of said gun member means for opening said check valve means and receiving directly through said bore forced high volume, high velocity ambient air at a discernible noise frequency therefrom, and said housing means operable at other times for fixedly connecting with second end nozzle means of said gun member means for opening said check valve means and evacuating pressurized medium directly through said bore from said dunnage bag, whereby said bag when inflated is operable to cushion products during shipment; and when deflated may be reused and later re-inflated to cushion goods during shipment.

\* \* \* \* \*